US006628765B1

(12) United States Patent
Bangs et al.

(10) Patent No.: US 6,628,765 B1
(45) Date of Patent: Sep. 30, 2003

(54) METHOD AND APPARATUS FOR PROVIDING SUBSCRIBERS WITH TELECOMMUNICATIONS INTELLIGENCE

(75) Inventors: Richard Alan Bangs, Colleyville, TX (US); Stephen Paul Brennan, Bedford, TX (US)

(73) Assignee: Verizon Corporate Services Group Inc., New York, NY (US)

( * ) Notice: Subject to any disclaimer, the term of this patent is extended or adjusted under 35 U.S.C. 154(b) by 210 days.

(21) Appl. No.: 09/653,809

(22) Filed: Sep. 1, 2000

(51) Int. Cl.[7] .............................................. H04M 15/00
(52) U.S. Cl. .............................. 379/112.01; 379/112.06; 379/112.07; 379/121.01; 379/126; 379/127.01; 379/133; 379/32.01
(58) Field of Search .......................... 379/32.01, 32.02, 379/32.03, 32.04, 32.05, 112.01, 112.06, 112.07, 112.08, 133, 134, 135, 137, 139, 140, 207.02, 207.03

(56) References Cited

U.S. PATENT DOCUMENTS

| | | | | |
|---|---|---|---|---|
| 5,588,048 A | * | 12/1996 | Neville ................... | 379/127.01 |
| 5,799,073 A | * | 8/1998 | Fleischer, III et al. .. | 379/112.01 |
| 5,825,769 A | * | 10/1998 | O'Reilly et al. ............ | 370/360 |
| 5,842,174 A | * | 11/1998 | Yanor ............................ | 705/1 |
| 5,896,445 A | * | 4/1999 | Kay et al. ................... | 379/135 |
| 6,075,848 A | * | 6/2000 | Lunn et al. ............. | 379/112.01 |

\* cited by examiner

*Primary Examiner*—Curtis Kuntz
*Assistant Examiner*—Quoc Tran
(74) *Attorney, Agent, or Firm*—Leonard Charles Suchyta; James K. Weixel

(57) ABSTRACT

A method and apparatus for providing customers with telecommunications intelligence in the form of call management reports. When a call is made to a subscriber of the service provided herein, a call detail record is created using the Telephone Company's Advanced Intelligent Network (AIN). Each call that is made to the customer is processed using AIN service logic programs (SLPs). The SLP is invoked by an AIN trigger that is applied to the track telephone number(s) of the customers that subscribe to this service. For each inbound call, the SLP records several pieces of identifying information in a call detail record. Periodically, the AIN application accumulates the call detail records for all customers subscribing to the service. The information is processed to retrieve the desired data from the call detail records, and the data retrieved is used to develop call management reports for each subscriber of the service. Then the call management reports are sent to the customer using the preferred method of transmitting this information. A third party provider that may not have the infrastructure to collect call detail records may contract with a Telephone Company that is capable of collecting call detail records through its AIN to provide these detail records so that intelligence data may be provided to the customers of the third party provider. The Telephone Company then bills the first company for the collection of the call detail records. The call detail records that are collected may be sent to a data processing company for processing of the records.

18 Claims, 4 Drawing Sheets

| LATA (key) | NPA-NXX OR NPA-NXX-X (key) | RATE CENTER | DIAL PLAN | COC | OCN |
|---|---|---|---|---|---|
| 552 | 817244 | FORTWORTH | | EOC | 9533 |
| 552 | 817245 | FORTWORTH | | EOC | 9533 |
| 552 | 817246 | FORTWORTH | | EOC | 9533 |
| 552 | 817247 | ARLINGTON | | PMC | 6010 |
| 552 | 817249 | FORTWORTH | | EOC | 9533 |
| 552 | 817251 | GRAPEVINE | | EOC | 4344 |
| 552 | 817252 | FORTWORTH | | EOC | 9533 |
| 552 | 817253 | GLENDALE | | PMC | 6671 |
| 552 | 817255 | FORTWORTH | | EOC | 9533 |
| 552 | 817256 | FORTWORTH | | EOC | 9533 |

FIG. 3

METHOD AND APPARATUS FOR PROVIDING SUBSCRIBERS WITH TELECOMMUNICATIONS INTELLIGENCE

BACKGROUND OF THE INVENTION

1. Technical Field:

The present invention relates to telecommunication services and in particular to a system for providing subscribers of a telecommunications service with intelligence data.

2. Description of the Related Art:

Businesses are continually seeking ways to improve their businesses and increase sales volumes. Marketing plays a significant role in this regard, and as such, techniques have been developed for analyzing the various markets served by a business. For instance, a Telephone Company may assign multiple virtual phone numbers to a customer for use in different advertisements. When any of these virtual numbers are called, the calls are redirected to a primary number unbeknownst to the caller. However, the telephone company can track the calls made to each virtual number or track number that is used solely for the advertisement and then issue a report to the company of factors such as the volume of calls and the geographic locations from which the calls were received. This report can be used by marketing personnel to determine which ads were most effective, where to advertise, and how much to spend on future advertising. Although the virtual number may be different from the company's regular business number or billing number, the call is generally routed to the same office. Such a system avoids the need for the company to ask how the customer learned of the company.

Currently, these types of intelligence gathering services are only provided by telephone companies because only the telephone companies have access to the infrastructure needed to perform this type of intelligence gathering. Thus, a company that does not have such an infrastructure is unable to provide this service to its customers. It would be desirable to provide such a company with a means by which it could provide intelligence data to its customers without requiring large capital investments in developing the required infrastructure necessary to provide the service. In this manner, any company desiring to provide the service to its customers may analyze the call detail records for a particular customer in order to provide the reports desired by the customer.

SUMMARY OF THE INVENTION

The present invention provides customers with telecommunications intelligence including geographical location, distribution, busy calls, answered calls, call duration, new callers, frequency of calls, etc. which may be in the form of call management reports. When a call is made to a customer of the service provided herein, a call detail record is created using the Telephone Company's Advanced Intelligent Network (AIN). Each call that is made to the customer is processed using AIN service logic programs (SLPs). The SLP is invoked by an AIN trigger that is applied to the track telephone number(s) of the customers that subscribe to this service. For each inbound call, the SLP records several pieces of identifying information in a call detail record. Periodically, the AIN application accumulates the call detail records for all customers subscribing to the service. The information is processed to retrieve the desired data from the call detail records, and the data retrieved is used to develop call management reports for each customer subscribing to the service. Then the call management reports are sent to the customer using the preferred method of transmitting this information.

In a preferred embodiment of the present invention, a third party provider that may not have the infrastructure to collect call detail records may contract with a Telephone Company that is capable of collecting call detail records through its AIN to provide these detail records so that intelligence data may be provided to the customers of the third party provider. In this manner, a third party provider can now harvest information from the Telephone Company in order to provide such a service to its customers. The Telephone Company then bills the third party provider for the collection of the call detail records. The third party provider may be a data processing company that processes the call detail records to generate call management reports. Thus, the present invention allows third party providers that do not have the necessary infrastructure to implement the invention to use the infrastructure of a telephone company to provide the advantages of the present invention.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is an illustration of a LATA table that may be used in a preferred embodiment.

DETAILED DESCRIPTION

Figure 1:
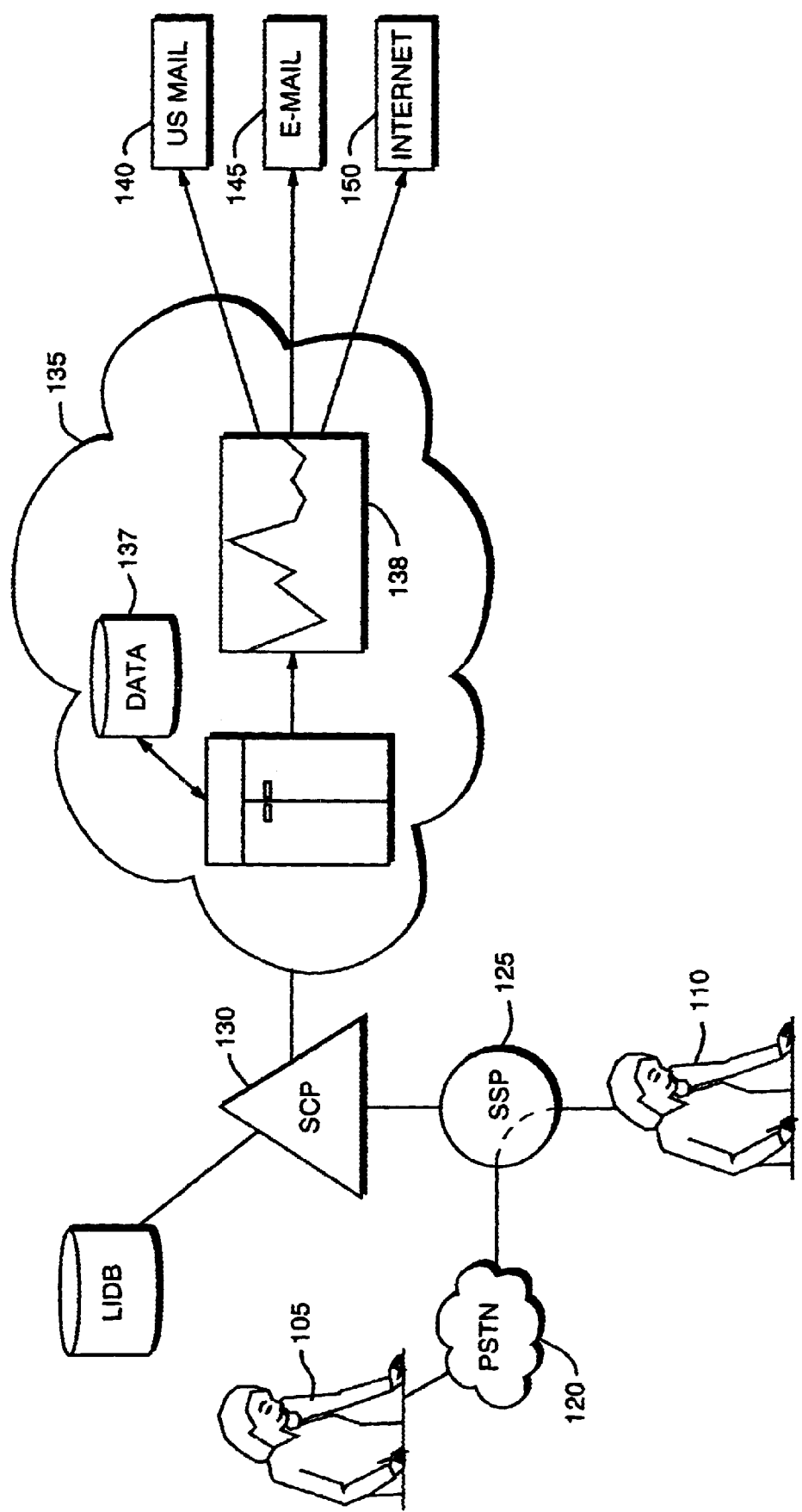
FIG. 1 is a schematic diagram of an embodiment of the present invention for an in-franchise customer.

Referring now to FIG. 1, a schematic diagram of an embodiment of the present invention is illustrated. A first caller 105 calls a customer 110 of an intelligence data service provided by using the present invention. The call is routed through a public switched telephone network 120 to the AIN (Advanced Intelligent Network)-equipped central office (CO) 125. The CO is also commonly referred to as a service switching point (SSP). SSPs are appropriately equipped programmable switches present in the telephone network which recognize AIN type calls, launch queries to the AIN Service Control Point (SCP) 130 and receive commands and data from the AIN SCP 130 to further process the AIN calls.

The SSP 125 is programmed to recognize the number(s) that is(are) assigned to the customer 110 for purposes of collecting call detail records. Thus, every time that one of these numbers is called, a query is launched to the SCP 130. An AIN trigger is placed on the customers number so that whenever the SSP recognizes the number being called, the query is launched. When the SCP 130 receives this query, the AIN service logic program (SLP) is invoked to collect information about the call. The information that may be collected includes date and time of the call, calling party number, called party number, calling party name, calling party zip code, call results (answer, no answer, or busy), call duration, and billing telephone number. However, additional or different information may be collected as requested by the customer 110. The SLP then instructs SSP 125 to provide call termination information and to complete the call. The SSP 125 completes the call to the customer 110. When the call is disconnected, SSP 125 sends the call results/duration information to the SCP 130 and the SLP logs this information. On a periodic basis, usually daily, the AIN SLP creates a file of call detail records using the detail records collected for the last period. This file is then used to create call management reports. Such reports may be created by the Telephone Company itself, or the file of call detail records may be sent to a third party provider for analysis and generation of reports.

In one embodiment, the call detail records file is sent to a third party provider such as a data processing company, via an FTP transfer or other acceptable means. The third party provider has a data processing application 135 that sorts the call detail records and obtains the calling party name and zip code from a national directory data source 137 for the calls that were made from outside the Telephone Company's franchise. Alternatively, the data processing company may supplement all of the call detail records with a name and zip code so that the Telephone Company does not have to retrieve them from its database. This supplemental information is valuable for building call management reports such as geographic call distribution reports. Once the call management reports 138 are created by the application 135, the reports are sent to the customer 110 via the preferred method. This method may be U.S. mail, e-mail, or the Internet, but is not limited to one of these methods.

Figure 2:
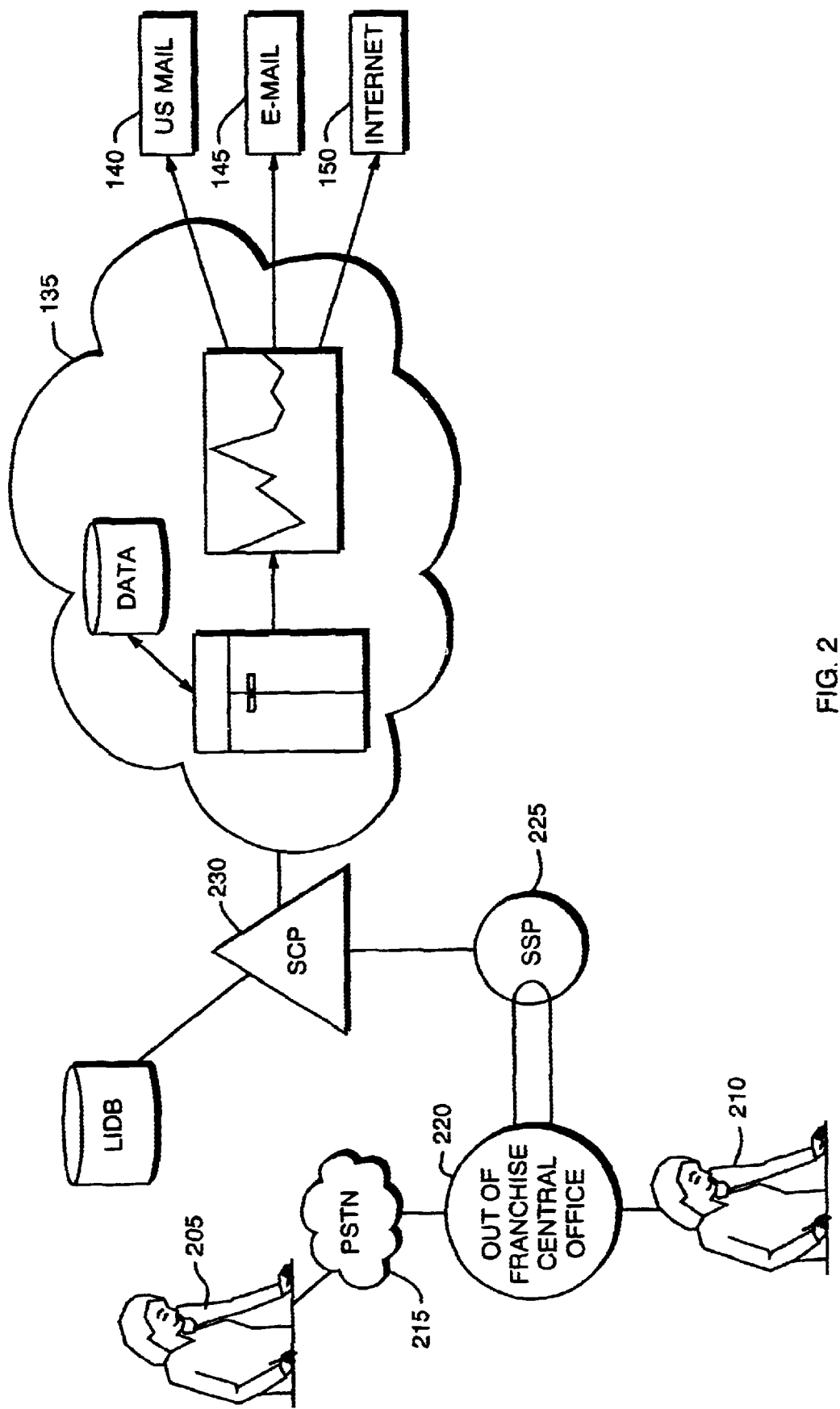
FIG. 2 is a schematic diagram of an embodiment of the present invention for an out-of-franchise customer.

Referring now to FIG. 2, a schematic diagram of another embodiment of the present invention is illustrated in which the customer 210 is associated with a CO 220 that is outside of the Telephone Company's franchise and does not have AIN capabilities. A call is placed by the caller 205 to the customer 210. The caller 205 may be responding to an advertisement placed by the customer 210, who has subscribed to the service described in this application. The call is then routed through the public switched telephone network 215 to the out-of-franchise central office 220 that serves the customer 210. The customer has call forwarding assigned to its primary number causing the call to be forwarded to a virtual number associated with SSP 225. SSP 225 is a central office which is AIN capable and is located within the franchise of the Telephone Company that is providing the service. When the call arrives at SSP 225, an AIN trigger is encountered which launches a query to the SCP 230. When the SCP 230 receives this query, the AIN service logic program (SLP) is invoked to collect information about the call. The information that may be collected includes date and time of the call, calling party number, called party number, calling party name, calling party zip code, call results (answer, no answer, or busy), call duration, and billing telephone number. However, additional or different information may be collected as requested by the customer 210. The SLP then instructs SSP 225 to provide call termination information and to complete the call. The SSP 225 completes the call to the customer 210. When the call is disconnected, SSP 225 sends the call results/duration information to the SCP 230 and the SLP logs this information. On a periodic basis, usually daily, the AIN SLP creates a file of call detail records using the detail records collected for the last period. This file is then used to create call management reports. In order to provision the service to an out-of-franchise customer 210, a business line is assigned to the SSP 225. The additional costs for forwarding calls to the business line account are charged to whoever is paying for the collection of the call detail records.

In one embodiment, a Telephone Company may act like a factory for producing files containing call detail records. Thus, rather than the Telephone Company providing the intelligence data service to the customer 210, the Telephone Company simply provides the file for use by a third party provider. This creates a wholesale market which encourages companies that would not otherwise be able to provide such a service to actually implement this service by using the Telephone Company's facilities. Thus, the capital involved in creating such a system need not be spent. This allows the third party provider to broaden its market and to provide a value added service to its customers.

For example, the third party provider could be a marketing company that uses the call detail records to analyze a market for its own customers. Thus, rather than the actual customer 210 being given access to the market analysis report or the call detail record management reports, the customer 210 may be oblivious to such reports. Instead, the reports could be used by the marketing company to determine where to spend money on advertising and what results are provided by a particular advertisement. The marketing analysis company could place a unique virtual number on an advertisement which causes the call to be routed to SSP 225 and then to the customer 210. This allows a determination of which advertisements are producing results. If the customer 210 hires the marketing company to spend a fixed amount of money on marketing or advertisement, the marketing company can then decide to use the service of the present invention in order to determine the most effective means of marketing for the customer 210. When used in such a manner, the present invention opens up the use of the system disclosed to not only retail use, but also wholesale use.

The SSPs 125, 225 contain special logic to determine whether a caller is an out-of-franchise caller or an in-franchise caller. The special logic detects whether the caller is out of franchise or in franchise by referring to tables that identify the rate center according to the first six digits of the telephone number. For instance, the first six digits, e.g. 972–718 (the NPA-NXX combination), indicate which telephone company's franchise serves the calling party. The first seven digits of the telephone number (NPA-NXX-X) may be required where 1 K Number Pooling is being used. Each NPA-NXX (or NPA-NXX-X as the case may be) combination within a Local Access and Transport Area (LATA) are defined in these tables. Such a table may be called a LATA table. The rate center assigned to each NPA-NXX or NPA-NXX-X (when applicable) are defined in the LATA table. A rate center is a uniquely defined geographical area within an exchange area used for determining mileage measurements for the application of interstate tariffs. This special logic for determining whether the caller is in-franchise or out-of-franchise is invoked whether the customer 110 is in-franchise as in FIG. 1 or out-of-franchise as in FIG. 2.

In one embodiment, the LATA table identifies the Originating Company Number (OCN) for a call based on the first six or seven digits in the calling party's telephone number. An example of a hypothetical LATA table is shown in FIG. 3. When a call is made to a customer, the SCP 130 performs a LATA table lookup using the calling party's NPA-NXX number. If the OCN retrieved from the table lookup corresponds to the OCN for the Telephone Company that is creating the call detail record, then the caller is in-franchise and a Line Information Database (LIDB) query is made to retrieve information such as the calling party name and zip code to add to the call detail record. If the OCNs do not correspond, then a LIDB query is not made. This method is more efficient because time and resources are not wasted making LIDB queries when there is no information in the database for the calling party. However, even though the Telephone Company does not have the name or zip code in its database, a national database may be used to determine the name and zip code based on the calling party number. This may be accomplished by the external application 135.

Figure 4:
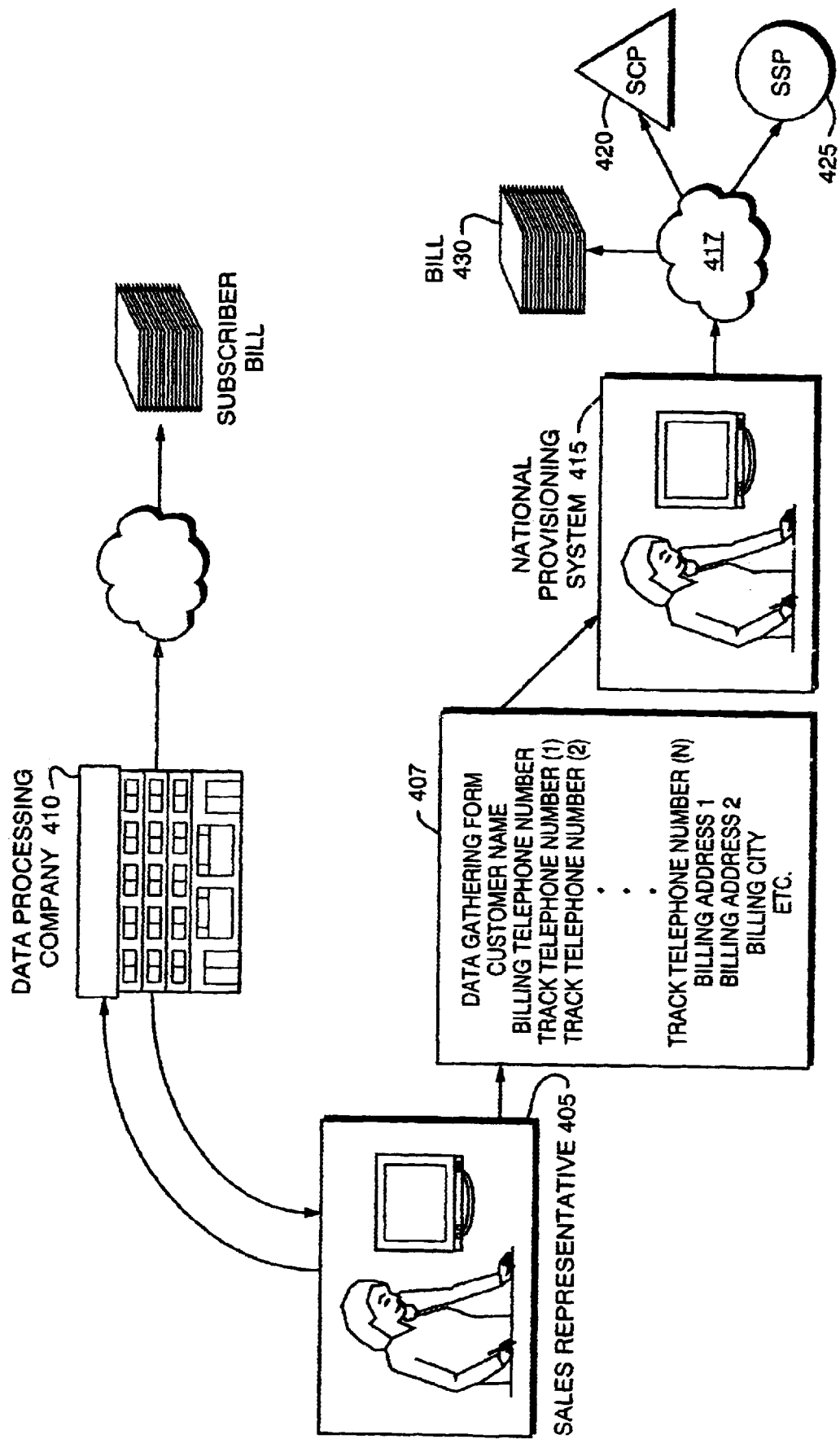
FIG. 4 is a flow diagram of a method of provisioning an embodiment of the invention.

Referring now to FIG. 4, a flow diagram of a method of provisioning of an embodiment of the invention is illustrated. A sales representative 405 at the Telephone Company that is to provide the call detail records is given a list or access to information concerning all of the geographic areas in which the Telephone Company has AIN SSPs that are capable of providing the service. The sales representative then confers with the third party provider 410 to determine which subscribers of the Data Processing Company's services will require the intelligence data for its telephone calls. This third party provider may be, for example, the data processing company discussed above. The sales representative 405 collects information on a data gathering form 407 for each customer that the Data Processing Company desires to track. This information may include the customer name, the billing telephone number, each telephone number that the customer wants to be tracked, the billing address, and other information such as a start/stop date as the Telephone Company deems necessary. This process may be automated by the use of an on-line or computerized form. Each of the data gathering forms are then sent to a National Provisioning System 415 that sets up the network to provide the service and billing. This is accomplished by populating the Call Processing Record (CPR) database in the SCP 420 associated with a given customer using an existing network infrastructure 417. The AIN trigger in the SSP 425 for the customer is also set up to trigger the AIN logic of the present invention whenever a call is made to one of the telephone numbers that is to be tracked. Based on the number of call detail records that are collected, a bill 430 is sent to the Data Processing Company 410. Typically the Telephone Company will charge a unit price for each record sent. The Data Processing Company may bill its customers for providing reports on a fixed fee basis, on a variable fee basis determined by the volume of calls, or some combination of the two.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method for providing intelligence data to a subscriber comprising:
   (a) collecting information regarding a call made to a telephone number assigned to said subscriber, wherein said collecting comprises:
      determining whether said call is made by an in-franchise caller; and
      retrieving a name and a zip code from a database responsive to determining that said call is made by an in-franchise caller;
   (b) storing said information as a call detail record;
   (c) creating a file containing a plurality of said call detail records; and
   (d) generating an intelligence report based on information contained in said file, wherein said step of generating is performed by a third party provider,
   wherein said step of determining comprises the following steps:
      retrieving from a table an originating company number corresponding to a telephone number of said calling party; and
      comparing said originating company number to an originating company number of a telephone company collecting said information, wherein if said originating company number corresponding to said telephone number and said originating company number of said telephone company are the same, then said call is made by an in-franchise caller.

2. The method of claim 1 wherein said step of collecting comprises the following steps:
   receiving said call at a service switching point;
   launching a query to a service control point responsive to receiving said call; and
   invoking a service logic program at said service control point to collect said information.

3. The method of claim 1 wherein said steps of collecting, storing, and creating are performed by a first company and said file is sent to a third party provider for performing said step of generating.

4. The method of claim 3 wherein said third party provider provides said intelligence report to said subscriber and wherein said third party provider pays said first company for providing said file.

5. The method of claim 4 wherein said information comprises a date, a time, a calling party number, a called party number, a call result, a call duration, and a billing telephone number.

6. The method of claim 5 wherein said information further comprises a calling party name and a calling party zip code.

7. The method of claim 1 wherein said step of retrieving is performed using a line information database query.

8. The method of claim 1 wherein, responsive to determining that said call is made by an out-of-franchise caller, a national database is accessed to retrieve said name and zip code.

9. An apparatus for providing intelligence data to a subscriber comprising:
   means for collecting information regarding a call made to a telephone number assigned to said subscriber, wherein said means for collecting comprises:
      means for determining whether said call is made by an in-franchise caller; and
      means for retrieving a name and a zip code from a database responsive to determining that said call is made by an in-franchise caller;
   means for storing said information as a call detail record;
   means for creating a file containing a plurality of said call detail records; and
   means for generating an intelligence report based on information contained in said file,
   wherein said means for determining comprises:
      means for retrieving from a table an originating company number corresponding to a telephone number of said calling party; and
      means for comparing said originating company number to an originating company number of a telephone company collecting said information, wherein if said originating company number corresponding to said telephone number and said originating company number of said telephone company are the same, then said call is made by an in-franchise caller.

10. The apparatus of claim 9 wherein said means for collecting comprises:

a service switching point for receiving said call; and a service control point connected to said service switching point to which a query is launched responsive to receiving said call, wherein said service control point invokes a service logic program to collect said information.

11. The apparatus of claim 9 wherein said means for collecting, storing, and creating are owned by a telephone company and wherein a data processing company owns said means for generating an intelligence report.

12. The apparatus of claim 11 wherein said data processing company provides said intelligence report to said subscriber and wherein said data processing system pays said telephone company for providing said file.

13. The apparatus of claim 9 wherein said information comprises a date, a time, a calling party number, a called party number, a call result, a call duration, and a billing telephone number.

14. The apparatus of claim 13 wherein said information further comprises a calling party name and a calling party zip code.

15. The apparatus of claim 9 wherein said means for retrieving comprises a line information database.

16. A computer program product in a computer readable medium for collecting call detail records for use in generating intelligence reports, the computer program product comprising:

(a) first instructions for determining whether a caller is in-franchise or out-of-franchise;

(b) second instructions for retrieving a calling party name and a zip code responsive to a determination by said first instructions that caller is in-franchise;

(c) third instructions for collecting a date, a time, a calling party number, a called party number, and a billing telephone number;

(d) fourth instructions for providing call terminating information for completing a call; and (e) fifth instructions for recording a call result and a call duration after said call is disconnected.

17. A method for generating intelligence data regarding a call made by a calling party to a telephone number assigned to a subscriber, comprising:

collecting information regarding the call;

retrieving from a table a first company number corresponding to a telephone number of the calling party;

comparing the first company number to a second company number of a telephone company collecting the information to determine whether the calling party is an in-franchise caller or an out-of-franchise caller;

retrieving at least one of a name and zip code from a national database based on whether the calling party is an out-of-franchise caller;

generating an intelligence report based on the collected information, wherein the intelligence report comprises the at least one of a name and zip code.

18. The method of claim 17, wherein the intelligence report comprises at least one of a date, a time, the calling party telephone number, a called party telephone number, a call result, and a call duration associated with the call.

* * * * *